United States Patent [19]

Yuda

[11] Patent Number: 4,903,933

[45] Date of Patent: Feb. 27, 1990

[54] CLAMPING APPARATUS FOR ADJUSTABLY POSITIONING SWITCHES

[76] Inventor: Lawrence F. Yuda, P.O. Box 176, Westminster, S.C. 29693

[21] Appl. No.: 224,677

[22] Filed: Jul. 27, 1988

[51] Int. Cl.⁴ ............................................. F16M 13/00
[52] U.S. Cl. .................................................. 248/500
[58] Field of Search ................. 248/674, 680, 309.1, 248/316.1, 316.5, 316.6, 359 R, 360, 500, 505, 74.1, 74.4, 74.5, 200, 225.31, 229; 24/514, 525, 569; 200/294

[56] References Cited

U.S. PATENT DOCUMENTS

| | | | |
|---|---|---|---|
| 237,821 | 2/1881 | Claussen | 248/201 |
| 823,378 | 6/1906 | Wagner | 24/569 |
| 1,019,343 | 3/1912 | Moore | 24/569 |
| 2,101,746 | 12/1937 | Manfredi | 24/525 |
| 2,461,256 | 2/1949 | Black | 24/525 |
| 2,582,384 | 1/1952 | Knollman | 248/74.4 |
| 2,634,928 | 4/1953 | Hawes | 248/229 |
| 2,733,492 | 2/1956 | Copell | 248/74.2 |
| 2,912,206 | 11/1959 | Ferris | 248/229 |
| 3,039,161 | 6/1962 | Gagnon | 24/514 |
| 4,352,476 | 10/1982 | Meeks | 248/74.1 |
| 4,375,879 | 3/1983 | Kojima | 248/74.1 |
| 4,487,449 | 12/1984 | Igel | 24/514 |
| 4,616,794 | 10/1986 | King | 24/514 |
| 4,723,503 | 2/1988 | Yuda | 294/907 |

FOREIGN PATENT DOCUMENTS

| | | | |
|---|---|---|---|
| 45912 | 3/1980 | Japan | 248/680 |
| 443437 | 2/1968 | Switzerland | 24/525 |

*Primary Examiner*—Ramon O. Ramirez
*Assistant Examiner*—Robert A. Olson
*Attorney, Agent, or Firm*—Bailey & Hardaway

[57] ABSTRACT

Apparatus is illustrated for positioning longitudinally spaced switches upon a base member which member may be the cylinder of a robotic control apparatus and which apparatus achieves a clamping action through the use of a fulcrum exerting a clamping intermediate the ends of a locking bracket.

7 Claims, 2 Drawing Sheets

CLAMPING APPARATUS FOR ADJUSTABLY POSITIONING SWITCHES

BACKGROUND OF THE INVENTION

Apparatus for positioning switches in longitudinal alignment for adjustment as to longitudinal spacing as when sensing the positioning of a magnetic field, such as illustrated in the robotic control apparatus of U.S. Pat. No. 4,723,503, presents difficulties in holding down a plurality of spaced switches in adjustable positions. Switching apparatus of the type which may be used in the control apparatus of the patent has included a channel shaped rail having an edge carried by one of the legs for engaging a longitudinal groove in the switches. By fastening the rail down with spaced screws with the legs or flanges extending downwardly toward the cylinder confining the switches, adjustment may be achieved through loosening of the screws, but such a construction has resulted in the switches inadvertently becoming loose while the device is in operation. Other apparatus has been relatively complex and bulky making it difficult to utilize a robotic control apparatus in confined spaces. The apparatus of the invention is also useful in other applications where it is desired to positively adjustably position a plurality of longitudinally spaced switches.

Accordingly, it is an important object of this invention to provide a clamping apparatus for adjustably positioning switches such as upon a cylinder of a robotic control apparatus where the switches are to sense the presence of magnetic fields in order to actuate a robotic action.

Another important object of the invention is to positively adjustably position switches obtaining a clamping action through the use of a fulcrum and locking bracket so as to prevent rattling and inadvertent displacement of the switches.

SUMMARY OF THE INVENTION

It has been found that the positive positioning of longitudinally adjustable switches may be achieved through the use of a simplified structure by employing a longitudinal rail together with a locking bracket extending over respective switches for engagement by a fulcrum carried by the rail wherein a member is provided for exerting a force between a free end of the locking bracket and the switch causing the locking bracket to bear against the fulcrum resulting in a positive clamping action adjacent opposite sides of the switches in respect of a base member carried by the switches.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
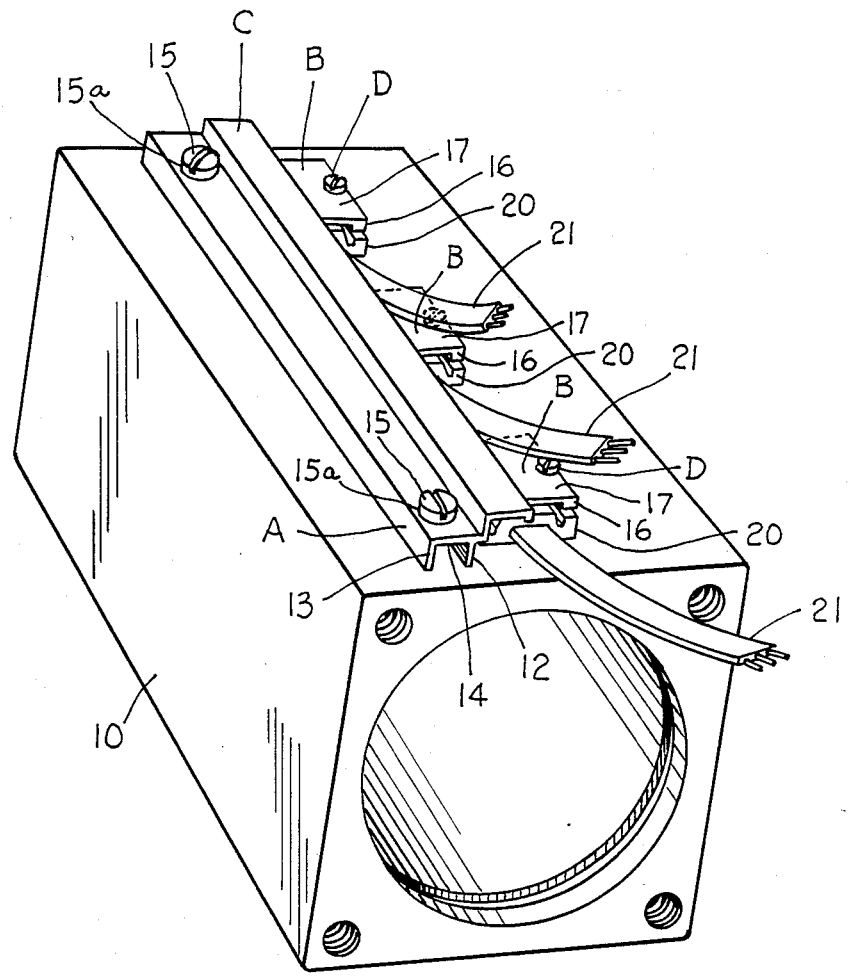
FIG. 1 is an enlarged perspective view illustrating apparatus for positioning longitudinally adjustable switches upon a cylinder constructed in accordance with the present invention.

Apparatus is illustrated for positioning longitudinally adjustable switches upon a base member including an elongated longitudinally extending rail A positionable in fixed relation upon the base member. A locking bracket B extends transversely over and engages respective switches adjacent one side adjacent the rail. A transversely extending rocker arm C is fixed upon the rail for extending over the locking brackets for exerting a force against an intermediate portion of the locking brackets. Means D are provided for bearing against the switches adjacent an opposite side of the switches remote from the rail urging a free end of the locking brackets outwardly and urging the intermediate portion of the locking brackets into engagement with the rocker arm. Thus, the locking brackets clamp said one side of the switches against the base member and the means for bearing against the switches clamps the opposite side of the switches against the base member.

Referring more particularly to the drawings, apparatus for positioning the longitudinally adjustable switches is illustrated as being positioned upon a base member 10 having a cylindrical hollow which may be of the type illustrated in U.S. Pat. No. 4,723,503.

The elongated longitudinally extending rail A is illustrated as including a channel shaped member having flanges 12 and 13 bridged by a web member 14. The rail is illustrated as being secured to the base member 10 on one side thereof as by spaced screws 15 having heads 15a and threaded shanks 15b which are threadably received within the base member 10. The locking bracket B which is illustrated as extending transversely over and engaging the switch includes an enlarged free end portion 16 which has an internally threaded bore 16a therein. The locking bracket has a link 17 connecting the enlarged end portion 16 with an inwardly extending flat flange portion 18 which is received within longitudinal groove 19 carried within the switch 20 as by a pressed fit.

Figure 2:
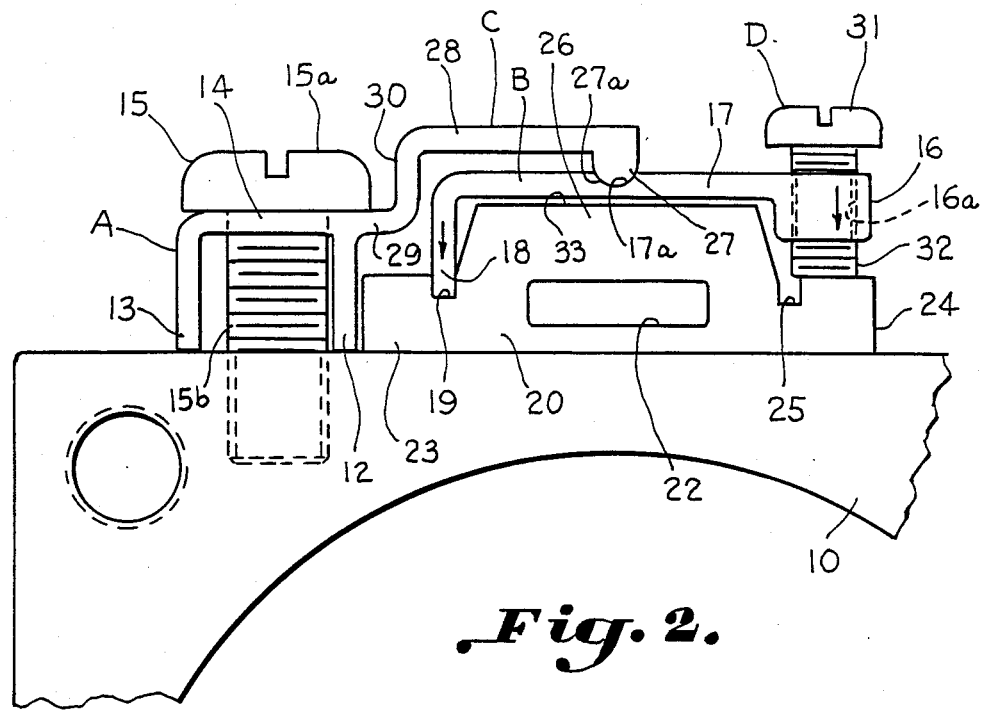
FIG. 2 is an end elevation further illustrating the apparatus for positioning the longitudinally adjustable switches upon the cylinder.

The switches 20 are illustrated as being Hall Effect Switches and suitable electrical leads are illustrated at 21 (FIG. 1) extending from a central portion 22 of the switches. The electrical switches 20 are further illustrated in FIGS. 2 as including marginal ear portions 23 and 24 which are defined by longitudinal grooves 19 and 25 in marginal portions of the switch which is illustrated as also including a raised body portion 26. When the transversely extending rocker arm C is separate from the locking bracket, it includes a fulcrum 27 at a free end thereof having an arcuate bearing portion 27a for reception with a complimentary groove which is illustrated as being arcuate at 17a within the link member 17.

An arm 28 connects the fulcrum 27 to a flange 29 which extends integrally from the rail A for connection by a web member 30.

The rail A, the locking bracket B and the transversely extending rocker arm C, the components of which are described above, may be formed by extruded plastic.

The means D for bearing against the ear portion 24 of the switch includes a head member 31 together with a threaded shank 32.

Figure 3:
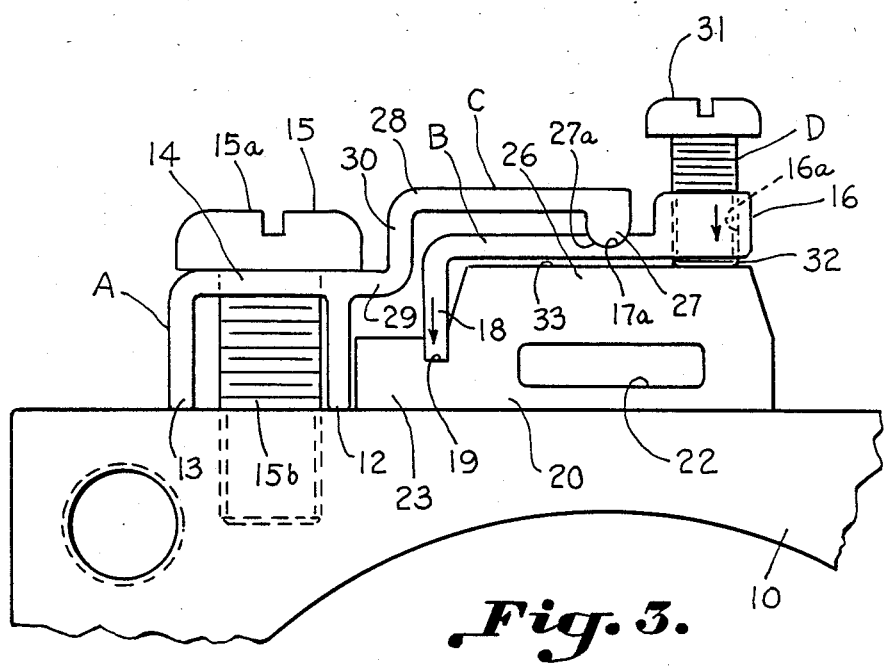
FIG. 3 is an end elevation illustrating a modified form of the invention.

In the alternate form of the invention illustrated in FIG. 3, the ear portion 24 is omitted and the threaded shank 32 bears directly against a marginal portion of the body 26 of the switch.

In both embodiments a positive contact is achieved on both sides of the intermediate portion 33 of the switch.

It is thus seen that a simplified form of the apparatus for positioning longitudinally adjustable switches upon a cylinder or base member may be provided utilizing an extruded rail section A together with a locking bracket carried on one end by the switch and having a rocker arm having a fulcrum on one end bearing against an intermediate portion of the locking bracket and carried by the rail and positions the switches clamping them down on both sides upon the base member. The clamping action is achieved through the use of a member exerting a force tending to separate the free end of the locking bracket from the adjacent portions of the switch. This member is illustrated as threaded including a threaded shank 32 carried by an enlarged portion at the free end of the locking bracket. Very little movement of the free end of the locking bracket is sufficient to exert the force necessary to create the positioning contact on each side of the switch with the cylinder or other base member.

While a preferred embodiment of the invention has been described using specific terms, such description is for illustrative purposes only, and it is to be understood that changes and variations may be made without departing from the spirit or scope of the following claims.

What is claimed is:

1. Apparatus consisting of longitudinally adjustable switches, means for positioning said switches upon a base member, and said base member, comprising:
    an elongated longitudinally extending rail with which said switches are aligned positionable in fixed relation upon said base member;
    a locking bracket extending transversely over and engaging respective switches adjacent one side thereof adjacent said rail;
    a transversely extending rocker arm fixed upon said rail for extending over respective locking brackets for exerting a force against an intermediate portion of said locking brackets; and
    means for bearing against said switches adjacent an opposite side of said switches remote from said rail urging a free end of said locking bracket away from said switch and, thereby, urging said intermediate portion of locking bracket into engagement with said rocker arm;
    whereby said locking brackets clamp said one side of said switches against said base member and said means for bearing against said switches clamps said opposite side of said switches against said base member.

2. The structure set forth in claim 1 wherein said rocker arm is separate from said locking bracket, including a fulcrum carried by a free end of said rocker arm, and an indentation carried by said intermediate portion of said locking bracket for receiving said fulcrum.

3. The structure set forth in claim 1 wherein said switches have a longitudinal groove adjacent one side receiving an end of said locking brackets engaging said switch.

4. The structure set forth in claim 1 wherein said means for bearing against said switch is a threaded locking screw threadably carried by said free end of said locking bracket, and an ear carried by said switch opposite said screw in bearing relation with said screw.

5. The structure set forth in claim 1 wherein said means for bearing against said switch is a threaded locking screw threadably carried by said free end of said locking bracket, whereby a body portion of said switch is in bearing relation with said screw.

6. Apparatus consisting of longitudinally adjustable switches each having a receptacle adjacent one side thereof upon a base member, said switches, and said base member, comprising:
    an elongated longitudinally extending rail positionable in fixed relation upon said base member;
    a locking bracket extending transversely over and engaging said receptacles adjacent said rail;
    a transversely extending rocker arm fixed upon said rail for extending over said locking bracket for bearing engagement with an intermediate portion of said locking bracket; and
    threaded means carried by a free end of said locking bracket for bearing against said switch adjacent an opposite side of said switch remote from said rail urging said free end of said locking bracket away from said switch and, thereby, urging said intermediate portion of locking bracket into engagement with said rocker arm;
    whereby said locking bracket clamps said one side of said switch against said base member and said means for bearing against said switch clamps said opposite side of said switch against said base member.

7. Apparatus consisting of adjustable switches, means for positioning said switches upon a base member, and said base member, comprising:
    a locking bracket extending transversely over and engaging said switches adjacent one side thereof;
    a fulcrum extending over said locking bracket for bearing engagement with an intermediate portion of said locking bracket; and
    means for bearing against said switch adjacent an opposite side of said switch urging a free end of said locking bracket away from said switch and, thereby, urging said intermediate portion of locking bracket into engagement with said rocker arm;
    whereby said locking bracket clamps said one side of said switch against said base member and said means for bearing against said switch clamps said opposite side of said switch against said base member.

* * * * *